(12) United States Patent
LaFeber, III

(10) Patent No.: US 6,325,022 B1
(45) Date of Patent: Dec. 4, 2001

(54) PET CAGE SCENERY AND TOYS FORMED OF MOLDED PAPER PULP

(76) Inventor: Theodore J. LaFeber, III, 25158 W. Elm St., Channahon, IL (US) 60410

( * ) Notice: Subject to any disclaimer, the term of this patent is extended or adjusted under 35 U.S.C. 154(b) by 0 days.

(21) Appl. No.: 09/379,030

(22) Filed: Aug. 23, 1999

(51) Int. Cl.[7] .................................................. A01K 29/00
(52) U.S. Cl. ............................................................ 119/708
(58) Field of Search .................................... 119/702, 707, 119/708, 709, 710, 711, 174; 446/73, 147, 465, 412, 413, 450

(56) References Cited

U.S. PATENT DOCUMENTS

| | | |
|---|---|---|
| 1,650,372 | 11/1927 | Maurer . |
| 1,773,141 * | 8/1930 | Hodgson . |
| 1,791,175 | 2/1931 | Tomlinson . |
| 2,241,410 | 5/1941 | Maurer . |
| 3,121,417 | 2/1964 | Goldman . |
| 3,312,465 | 4/1967 | Braunhut . |
| 3,941,631 | 3/1976 | Kirk . |
| 3,964,432 | 6/1976 | Rodemeyer . |
| 4,104,822 * | 8/1978 | Rodgers . |
| 4,437,432 | 3/1984 | Immeyer . |
| 4,888,220 | 12/1989 | Mehta . |
| 5,022,345 | 6/1991 | Bolivar . |
| 5,269,256 * | 12/1993 | Viola ..................................... 119/707 |
| 5,423,290 | 6/1995 | Payne . |
| 5,797,353 * | 8/1998 | Leopold ............................... 119/710 |
| 5,967,874 * | 12/1999 | Shaw et al. ............................ 446/73 |

* cited by examiner

Primary Examiner—Thomas Price
(74) Attorney, Agent, or Firm—Michael Best & Friedrich, L.L.C.

(57) ABSTRACT

A safe, non-toxic pet toy is provided which is adapted to be placed within the cage of a small captive animal. The pet toy is formed of materials which may be safely ingested by a small animal so that an animal may safely peck, chew, or gnaw on the toy. The toy is made of paper pulp molded to form a three dimensional representation of an object. A dye may be incorporated into the paper pulp to color the object or a non-toxic ink may be applied to a surface of the object to provide a more enticing and realistic appearance.

22 Claims, 2 Drawing Sheets

PET CAGE SCENERY AND TOYS FORMED OF MOLDED PAPER PULP

BACKGROUND OF THE INVENTION

The present invention relates to vacuum or pressed molded fiber products that may be formed into decorative backgrounds, figurines, and toys that may be placed in a birdcage or other small animal cage to provide a more stimulating environment for the animal while making the cage more attractive and interesting to the pet owner.

Many household pets, such as birds, hamsters, gerbils, mice, and others, live in a cage of one sort or another. Such animals must be caged, not only to prevent the animal from taking flight, but also to protect the animal from domestic predators such as the family cat. Most household pet cages are exposed on all sides so that the animal is viewed from many different angles. While such visibility and openness is conducive to the pet owner's enjoyment of the animal, it can be very detrimental to the animal itself, especially for animals that are naturally prey. Most prey animals' natural instinct is to fly or take cover when danger such as a cat, dog, new person or a child that walks by a cage too fast is near. Unfortunately, these options are not available to an animal living in an exposed cage. This constant exposure to what most animals would consider a perilous situation can be very stressful on a small pet. In birds, this can often be a cause of feather picking and sometimes biting.

Another detriment to the confirmed living conditions of household pets is the lack of both physical and mental stimulation. Living in the wild provides most animals with sufficient stimuli to maintain their mental and physical edge. In the daily routine of a house pet, however, most natural sources stimulation are removed, and the tendencies toward boredom and lethargy easily occur. Therefore, the caring pet owner, in addition to providing some form of refuge within the animal's cage, will also attempt to provide the pet with mental and physical stimuli. Pet mice, for example, are often provided with an exercise wheel to run on for both pleasure and aerobic exercise.

Unfortunately, it is often more difficult to provide adequate mental and physical stimuli for birds. Most birdcages are generally too small for full-fledged flight, and birds can not use exercise wheels. However, pecking, chewing, and tearing at objects is an instinctual activity that provides both mental and physical stimulation for caged birds, and is an activity which can be safely carried out in the birdcage. Thus, providing various objects within a bird's cage that encourage pecking, chewing and tearing will go a long way in improving both the physical and emotional well being of the bird.

A difficulty in providing a suitable toy is providing an object that will attract the bird's attention and induce beak activity. Another consideration is the hardness of the object provided. The pecking toy must be soft enough that the bird will not damage its beak, yet hard enough to offer sufficient resistance to make the experience both challenging and rewarding.

The same type of objects that are well suited for birds to chew will be well suited for other small pets as well. Rodents have an instinctual need to chew. Thus, toys placed within a mouse or gerbil cage expressly for this purpose will fulfill this natural desire.

Many animal toys are available for providing stimulus to caged animals. U.S. Pat. No. 1,791,175, for example, is representative of such toys. There, birdseed is compressed into a solid mass and fashioned into an object such as a bell. The compressed mass may further include a toy such as an actual bell suspended therefrom.

In another example, U.S. Pat. No. 5,423,290 provides a nesting facility for parakeets. The nesting facility comprises a hard cylindrical shell surrounding a relatively soft nesting material. By pecking at the soft inner material the parakeet may partially hollow out the cylindrical shell to form a nest.

U.S. Pat. No. 3,964,438 discloses a food blanket for animals such as hamsters and gerbils. A pad comprising multiple layers of synthetic material is provided having pet food dispersed between the various layers. The animal is enticed to forage through the pad in order to obtain the food hidden therein.

Yet another bird toy is disclosed in U.S. Pat. No. 5,022, 345. There, various elements are joined on a string or chain suspended from the top of a birdcage. The various elements comprising the toy are wood, a bell, rawhide, hemp, beads, leather and plastic.

While the prior art contains numerous examples of toys for caged house pets, the present invention provides a unique combination of aesthetic qualities pleasing to both the pet owner and the occupant of the cage along with the utilitarian function of providing a peckable or chewable object which may be safely consumed by a small animal.

SUMMARY OF THE INVENTION

A primary object of the present invention is to provide pet cage scenery and toys adapted to be placed within a small animal's cage in order to provide a more attractive, stimulating environment for the animal.

Another object of the invention is to provide pet cage scenery and toys that may be safely consumed by the playing pet.

A further object of the invention is to provide pet cage scenery and toys which the pet pecks chews and tears, thereby providing both mental and physical stimulation for the animal.

A still further object of the invention is to provide pet cage scenery which offer a degree of cover such that the animal may feel more secure and protected within its cage.

Yet another object of the present invention is to provide pet cage scenery and toys which are relatively inexpensive such that the toys may be readily replaced after the pet has pecked or gnawed through a significant portion of the toy.

All of these objects, as well as others which will become apparent upon reading the detailed description of the preferred embodiments of the invention, are met by the pet toys formed of molded paper pulp herein disclosed.

Among the myriad advantages of the vacuum molded fiber or paper pulp pet toys of the present invention, is that the paper pulp pet toys may be safely pecked at, chewed upon, or otherwise eviscerated and consumed by a small house pet without serious detriment to the animal. Further, the consistency of the molded fiber toys may be controlled so as to enhance the pecking or gnawing experience, and may be specifically formulated to fit the needs of a particular species.

In a first embodiment, three-dimensional scenic backgrounds are provided. Such backgrounds are formed as a single molded sheet having several three-dimensional objects protruding from the surface of the sheet. Such objects can be fashioned as trees, rocks, or other objects which might be attractive to the species whose cage the background is to adorn. The three-dimensional background may be printed with a brightly colored scene corresponding to the three-dimensional objects protruding from the molded sheet. When placed in an animal's cage the molded sheet provides a degree of cover on at least one side of the cage, though many veterinarians recommend covering two sides of the cage in this manner. Individual molded sheets may be formed with interlocking edges such that multiple sheets may be combined to form larger backgrounds. This allows the product to work well with cages of larger size. Seeds, or other food, may be molded into the background in order to entice an animal to peck at or chew on the background, thereby also providing the animal with opportunities for exploration and nutrition.

In an alternate embodiment, paper fiber may be vacuum molded into figurines which may be placed in an animal's cage. In this embodiment, the paper fibers may be molded into brightly colored figures representing cats, hands or other objects that the pet and owner find amusing. As with the first embodiment, seeds or other food may be embedded within the figurine to stimulate more activity on the part of the animal.

In yet another embodiment, the molded fiber or paper pulp toys may be formed as hollow boxes in which food or treats may be hidden, somewhat like pinatas. In this embodiment the animal will be encouraged to peck or chew its way through the paper pulp to gain access to the food inside. The individual boxes may be adorned with fun faces that enhance the decor of the cage. Several such "pet pinatas" may be mounted on a support rod or string and suspended from the top of the cage, a configuration especially well adapted for birdcages.

DETAILED DESCRIPTION OF THE PREFERRED EMBODIMENTS

Figure 1:
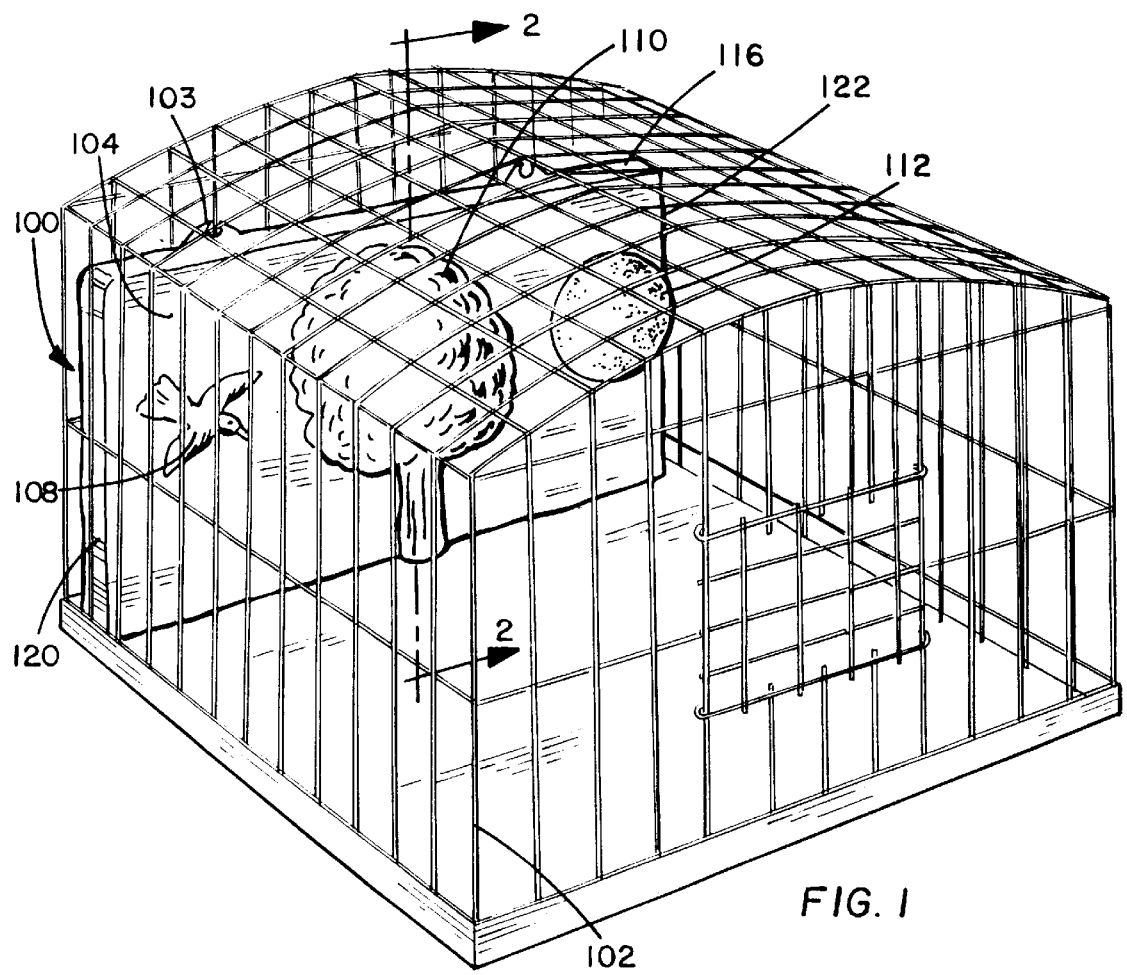
FIG. 1 is a perspective view of an exemplary birdcage having a molded paper pulp background according to a first embodiment of the invention mounted therein.
Figure 2:
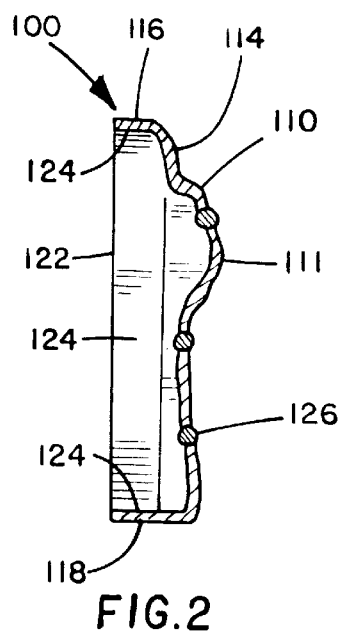
FIG. 2 is a cross section of the molded paper pulp background of FIG. 1 taken along the line 2—2.
Figure 3:
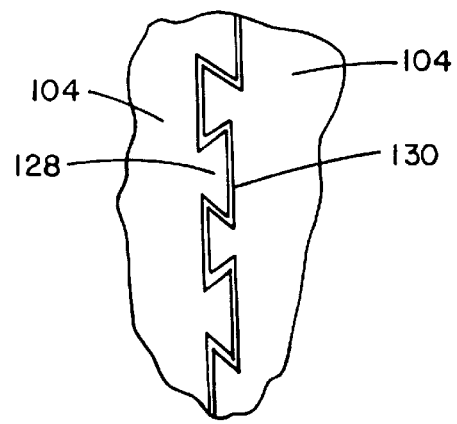
FIG. 3 is a plan view of the edges of a molded paper pulp background according to an alternate embodiment of a molded paper pulp background.

Referring to FIGS. 1–3, a molded fiber or paper pulp background according to a first embodiment of the invention is shown at 100. The background comprises a relatively flat sheet 104 of molded cellulosic fiber, or paper pulp. In FIG. 1, the background 100 is mounted to the back wall of a square or rectangular cage 102. The molded background may include fasteners such as clips 103 for attaching the background to the bars of the cage. Further, the relatively flat sheet 104 may be formed in an arc rather than as a flat sheet, so as to be mountable in a circular cage rather than the rectangular cage 102 depicted in FIG. 1.

The molded background 100 further includes a plurality of three-dimensional protuberances providing texture and depth to the scene depicted on the background. In the scene depicted in background 100, the protuberances are molded to represent a bird 108, a tree 110, and a sun 112, although any object may be substituted therefor depending on the desired scene to be depicted. For example, the molded background could be configured to represent a city scene, a jungle, or some other landscape. A visual image is applied to the surface of the background to further define the scene depicted thereon. The image may be applied via a non-toxic ink, paint, brightly colored dye, or some other coloring agent applied to the molded paper pulp background.

Background 100 is shown in cross section in FIG. 2. The section shown is taken directly through the center of tree 110. Thus, it can be seen that the forward contours 111 of the tree 110 extend beyond the plane of the relatively flat front surface 114 of background 100. Furthermore, the top, bottom, and side edges 114, 116, 118, 120 may be formed in a reward facing lip 124 to add rigidity to the background 100. Birdseed 126 or other food especially adapted for the particular species to be housed within cage 102 may be embedded at random or regular intervals within the molded paper pulp comprising background 100, providing an added incentive for the bird or animal to peck or gnaw on the background.

An additional feature which may be included is shown in FIG. 3. Any or all of the edges 116, 118, 120, 122 may be formed with interlocking structures such as the dove-tailed tenon 128 and mortise 130 configuration shown in the drawing. Such interlocking features allow multiple backgrounds to be joined in order to cover a larger area, and allows a pet owner to create larger, more varied backgrounds. Also, overhead and floor panels may be provided, such as a blue dome to represent the sky, or a green floor panel to represent grass, and so forth. Alternatively, a pet-safe dye may be incorporated into the molded cellulosic fiber to give the background a generally uniform color.

Background 100 serves a number of important functions. First, the background provides an aesthetically pleasing environment, which may be enjoyed by both the pet and pet owner alike. Also, the background provides cover, in that, with the background covering the backside of the cage, the animal is exposed on only three sides rather than four. If additional panels are provided, the animal may feel even more secure. In addition to the security provided by the background, the paper pulp construction of the background and the non-toxic ink or non-toxic dye used to color the paper pulp provide a safe, healthy material for the animal to peck and gnaw on, thereby providing both mental and physical stimulation for the animal. By embedding seed or other food within the molded paper pulp, the animal will be further induced to peck and gnaw at the background. Yet another advantage is that molded paper pulp backgrounds according to the present invention are relatively inexpensive and may be easily replaced after the animal has consumed a significant portion of an individual background.

Figure 4:
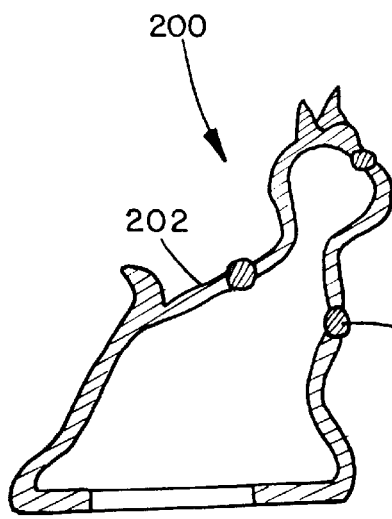
FIG. 4 is a cross section of a second embodiment of the invention.

Referring now to FIG. 4, a pet toy according to an alternate embodiment of the invention is shown at 200. As with the previous embodiment, animal toy 200 is formed of vacuum molded fiber or paper pulp. However, rather than being molded into a substantially planar sheet, the toy is molded into a figurine 202, in this instance a cat. The molded toy 200 may be alternately molded into any figure that will likely gain the attention of the particular pet for which it is provided. Again, similar to the previous embodiment the figurine may be printed with non-toxic ink or non-toxic dye in order to provide a more life-like, attention grabbing appearance or a dye may be incorporated into the molded paper pulp. Further, birdseed or other food 204 may be embedded within the molded product in order to entice the animal to attack the figurine 202.

Figure 5:
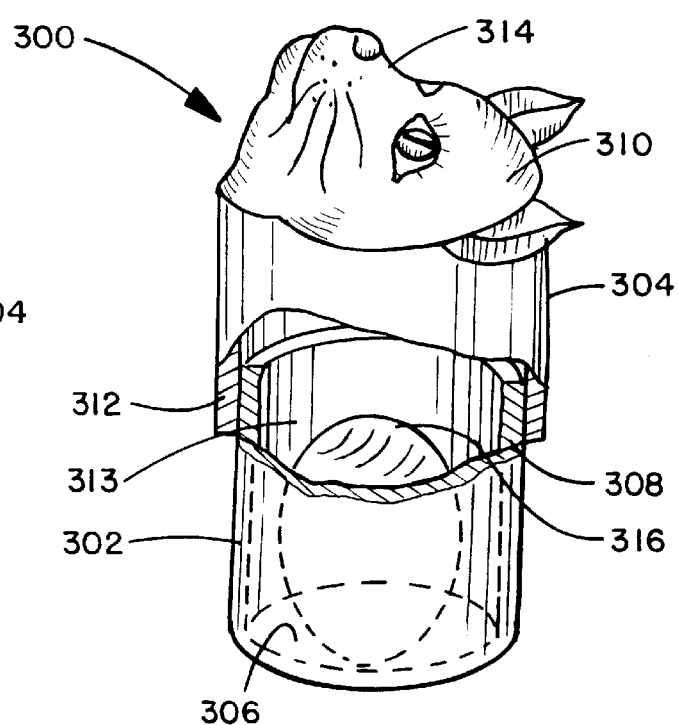
FIG. 5 is a perspective and partial cut-away view of a third embodiment of the invention.
Figure 6:
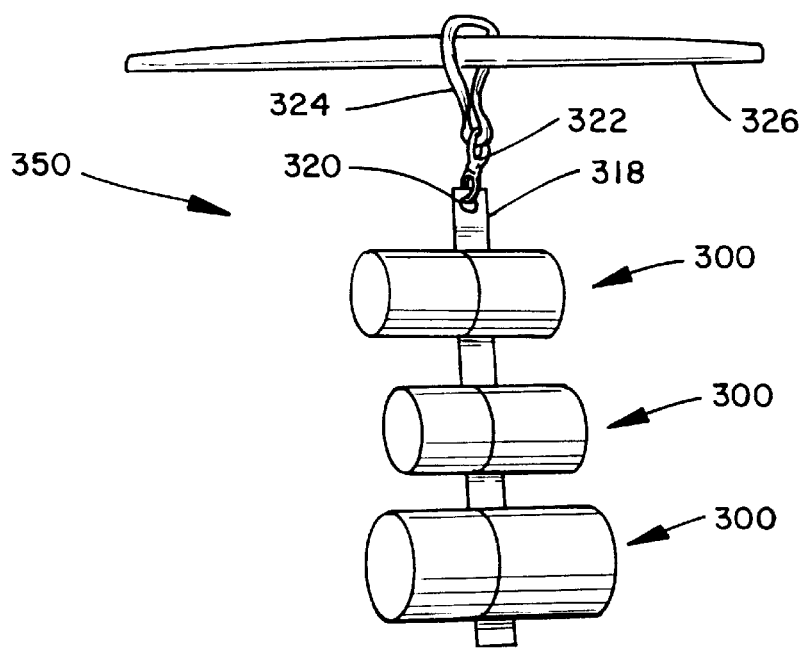
FIG. 6 is perspective view of a pet pinata comprising a plurality of paper pulp toys according to the embodiment shown in FIG. 5.

A third embodiment of the invention is shown in FIGS. 5 and 6. In FIG. 5 a pet piñata is shown individually at 300. The piñata 300 is formed of two separate pieces formed of molded fiber or paper pulp, a base 302, and a cover 304. The base is formed with a closed bottom panel 306 and sidewall 308. In the preferred embodiment, sidewall 308 is cylindrical, though any other shape such as a square, rectangle, or diamond will work to equal effect. The cover 304 similarly comprises a closed top 310 and a sidewall 312. The shape of sidewall 312 follows that of sidewall 308 of the base 302. However, the inner dimensions of the cover sidewall 312 are slightly larger than the outer dimensions of the base side wall 308. Thus, in the preferred embodiment, the cover sidewall 312 is a cylinder having an inner diameter slightly larger than the outer diameter of the base side wall 308. The top 310 of cover 304 may be formed with a decorative face 314, such as the cat face shown, or some other design to make the pinata more interesting to an animal. Further, the outer surfaces of the base 302 and cover 304 may be printed with a non-toxic ink or the paper dyed with a non-toxic dye to provide a more finished decorative appearance.

The larger diameter of the cover sidewall 312 allows the cover side wall to slide over the base side wall 308 as depicted in FIG. 5. By placing the cover 304 over the base 302 in this manner, a small box or container is formed, defining a small inner chamber 313. A small pet treat 316, such as a peanut, seeds, or some other pet treat such as NUTRIBERRIES® bird food available from LAFEBER® Company, 24981 North 1400 East Road, Cornell, Ill., 61319 or feed pellets for hamsters and gerbils, may be placed inside chamber 313. Since the base 302 and cover 304 are formed of molded paper pulp, the animal may safely peck or gnaw its way through the piñata 300 to attain the treat 316 hidden therein.

FIG. 6 shows a pet toy 350 comprised of a plurality of pet piñatas 300. Toy 350 comprises a shaft 318 on which the piñatas 300 are mounted. Various other mounting structures such as chains, strings, or others may be substituted for shaft 318 as desired. Shaft 318 is formed with a small eyelet 320 near the top through which a first end of a small segment of chain 322 is attached. The second end of chain 322 is connected to a clip 324 for suspending the toy 350 from one of the bars 326 of an animal's cage. The configuration of FIG. 6 is particularly well adapted for use in birdcages. With toy 350 suspended from the top of a cage, a bird is free to fly up to the toy, where it can perch and begin pecking with abandon at the various piñatas in order to gain the treats hidden inside them.

In each of the embodiments described above it may be desirable to provide toys having varying degrees of hardness, or resistance to being pulled apart. For example, it may be desirable to place especially strong toys in cages with particularly aggressive species, and perhaps softer toys in cages housing more passive species. In manufacturing vacuum molded fiber products a number of factors influence the ultimate strength and hardness of the product. These factors may be manipulated singly or in combination to provide molded pet toys of varying hardness and strength appropriate for a wide range of animal species.

A first factor in determining the strength of the final molded fiber pet toy is the selection of the cellulosic fibers from which the toy is to be produced. The length and surface area of the fibers will affect how well the fibers bond to one another, and will affect the overall hardness of the toy. Longer fibers with greater surface area will produce stronger and harder toys. Also, bonding agents and other chemical additives such as synthetic polymers and modified starches may be introduced into the premolded fiber suspension to enhance the bonding characteristics of the cellulosic fibers resulting in stronger, harder toys. As noted earlier, pet-safe dyes may also be introduced to give the final product a generally uniform color.

Another factor that influences the strength and hardness of the final vacuum molded product is the manner in which the product is dried. If the product is dried quickly and the fluid remaining in the product post molding is allowed to boil, the result will be a softer, fluffier product. On the other hand, if the product is dried slowly, the capillaries between fibers will collapse as the fluid recedes, and a significant amount of additional bonding will occur. Thus, a stronger harder product will result. What is more, if a slow evaporative drying process is employed, additional stiffening agents such as wax or acrylic may be applied to the surface of the product, and reabsorbed into the product as the fluid recedes. Obviously, the presence of such stiffening agents will increase the strength and hardness of the final product.

The various embodiments disclosed herein provide pet toys which entice an animal to destroy them. The activity engendered in destroying the toys comprises a healthy stimulus that will improve the quality of life for a captive pet. Further, the construction of the toys is such that an animal may ingest portions of the toy with no harmful effects. Therefore, the invention provides a safe and healthful addition to the art of small animal pet toys.

It should be noted that various changes and modifications to the present invention may be made by those of ordinary skill in the art without departing from the spirit and scope of the present invention which is set out in more particular detail in the appended claims. Furthermore, those of ordinary skill in the art will appreciate that the foregoing description is by way of example only, and is not intended to be limiting of the invention as described in such appended claims.

What is claimed is:

1. A pet toy adapted to be placed in the cage of a small captive animal such that said animal may peck, chew, or gnaw on said toy, the toy comprising paper pulp molded to form a three dimensional representation of an object.

2. The pet toy of claim 1 wherein the pet toy comprises non-toxic materials such that portions of said pet toy may be ingested by said animal with no detrimental effects to the animal.

3. The pet toy of claim 1 wherein said molded paper pulp pet toy comprises a generally planar sheet forming a background with said three dimensional representation protruding from a surface of said planar sheet.

4. The pet toy of claim 3 further comprising pet food embedded within said molded paper pulp.

5. The pet toy of claim 1 wherein a dye is incorporated into the paper pulp.

6. The pet toy of claim 1 wherein said three-dimensional representation of an object comprises a free standing figurine.

7. The pet toy of claim 6 wherein said figurine further comprises means for suspending said figurine within said cage.

8. The pet toy of claim 6 further comprising pet food embedded within said molded paper pulp.

9. The pet toy of claim 1 further comprising:
a molded box defining an internal chamber; and
a food particle disposed within said chamber.

10. The pet toy of claim 9 wherein said box comprises a molded paper pulp cover and a vacuum molded paper pulp base insertable into said cover.

11. The pet toy of claim 1 further comprising a non-toxic coloring agent applied to the representation to provide a more aesthetically pleasing appearance.

12. The pet toy of claim 1 comprising vacuum molded paper pulp.

13. The pet toy of claim 1 further comprising a bonding agent added to said molded paper pulp whereby the hardness of said pet toy is increased.

14. A pet toy comprising paper pulp molded into a free standing figurine representing an object, said figurine having an image applied thereto to enhance the resemblance of said figurine to said object.

15. The pet toy of claim 14 further comprising pet food embedded within said molded paper pulp.

16. The pet toy of claim 14 further comprising a dye incorporated into the paper pulp.

17. A pet toy for small animals confined to a cage, the pet toy comprising a molded paper pulp container having pet food specially adapted for a particular species enclosed therein.

18. The pet toy of claim 17 wherein said container comprises:
   a molded paper pulp cover;
   a molded paper pulp base insertable into said cover forming a substantially enclosed chamber therewithin; and
   said pet food disposed within said chamber.

19. The pet toy of claim 18 wherein said cover includes molded decorative features such that said cover resembles an object of interest to the species of animal confined within said cage.

20. The pet toy of claim 18 wherein said pet food is embedded within said chamber to substantially fill said container may have food imbedded into such that it fills the entire three-dimensional cavity.

21. The pet toy of claim 17 further comprising a plurality of said molded paper pulp containers mounted on a support member, and wherein said support member is configured to be suspended from said cage.

22. The pet toy of claim 17 comprising vacuum molded paper pulp.

* * * * *